E. STASSANO & N. PETINOT.
ELECTRIC FURNACE FOR MEDIUM TEMPERATURES PARTICULARLY FOR MELTING COPPER
AND ITS ALLOYS.
APPLICATION FILED JULY 18, 1913.

1,093,494. Patented Apr. 14, 1914.

UNITED STATES PATENT OFFICE.

ERNESTO STASSANO, OF TURIN, ITALY, AND NAPOLEON PETINOT, OF NIAGARA FALLS, NEW YORK.

ELECTRIC FURNACE FOR MEDIUM TEMPERATURES PARTICULARLY FOR MELTING COPPER AND ITS ALLOYS.

1,093,494.   Specification of Letters Patent.   Patented Apr. 14, 1914.

Application filed July 18, 1913. Serial No. 779,818.

*To all whom it may concern:*

Be it known that we, ERNESTO STASSANO and NAPOLEON PETINOT, of Turin, Italy, and Niagara Falls, New York, United States of America, respectively, have invented certain new and useful Improvements in Electric Furnaces for Medium Temperatures Particularly for Melting Copper and Its Alloys, of which the following is a specification.

Our invention relates to electric furnaces for medium temperatures particularly for melting copper and its alloys, the main new features of which are the shape and construction of the melting chamber as well as the shape and construction of the electrode-holders and an air-lock hopper which permits the charging of the material to be melted without allowing communication between the melting chamber and the atmosphere outside of the furnace.

Our furnace is of the well known type which heats the charge by radiation from an electric arc formed between two electrodes, situated above the charge, as well as by the reflected heat from the roof or that part of the furnace above the charge. We have overcome by our invention certain serious objections to small furnaces of this type, which we have heretofore described. First. There is a rapid destruction of the lining of the furnace in all of the parts not covered by the charge and which are, therefore, exposed to the intense heat radiated from the arc. Second. There are serious heat losses through the lining where this is covered by the charge. In our invention, however, provision is made to receive a maximum heat circulation in the parts protected from the direct radiation of the arc. There is also a sufficiently low heat insulation provided for at the places exposed to the direct radiation in order to prevent the rapid destruction of the refractory lining. Moreover for certain purposes, especially the melting of the alloys of copper, it is important to have the furnace used for the purpose perfectly air-tight, and we have accordingly in combination with our furnace improved our forms of electrode holders and charging device.

Figure 1:
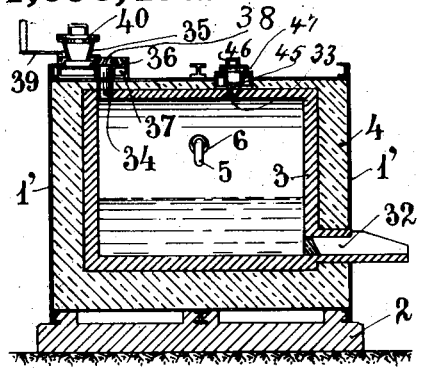
Figure 2:
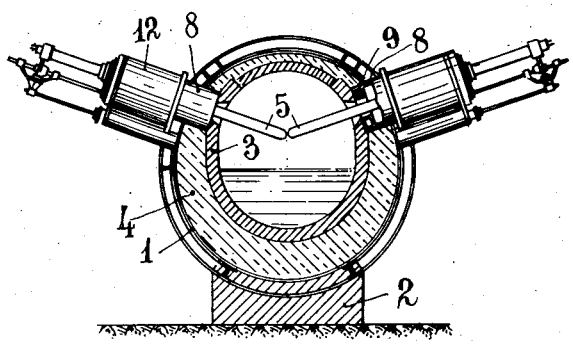
Figure 3:
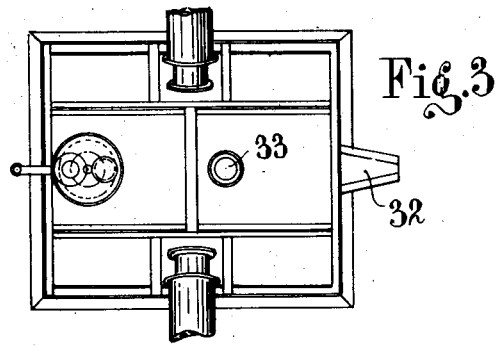
Figure 5:
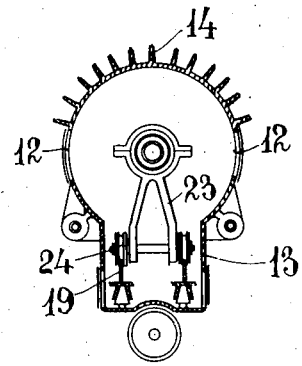
Figure 4:
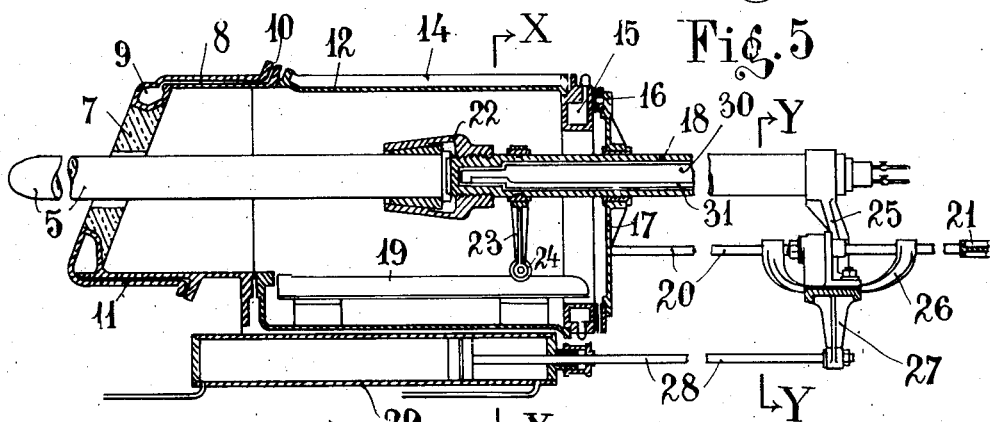
Figure 6:
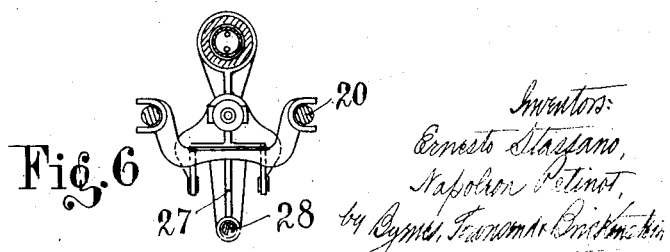

The annexed drawing shows one form of a furnace constructed according to this invention, Figure 1 is a longitudinal vertical section, Fig. 2 is a transverse vertical section, Fig. 3 a plan, Fig. 4 shows the details of the construction and direction of the electrode-holders, Fig. 5 is a section on line $x$—$x$ of Fig. 4 and Fig. 6 is section on line $y$—$y$ of Fig. 4.

As shown in Figs. 1–3, the main body of the furnace consists of a cylindrical casing 1 having its axis horizontal and made for example, of sheet iron. The ends of the cylinder (1) may be flat or convex in an outward sense. The cylinder is mounted on the base (2). The melting chamber (3) is approximately cylindrical in form, its axis not coinciding with the axis of the casing but being vertically above it. While the melting chamber may be perfectly cylindrical, the preferable construction is that shown in the drawing where the bottom and top of the chamber are cylindrical in form and the sides are flat.

The melting chamber (3) is formed of a refractory material, for example magnesia, and the space (4) between it and the casing (1) is filled with a good heat insulator.

Owing to the eccentric location of chamber (3) in the casing (1), the top of which is exposed to the direct heat radiated from the arc, it is easily kept cool, thus avoiding a rapid destruction of the lining; while the lower part of the cylinder, which is not only at a greater distance from the arc but is protected from the direct heat by the charge, is well provided with a thick layer of insulation, thus diminishing the heat losses of the furnace.

The furnace charge is heated by means of an arc formed between the electrodes (5) which pass through the lining of the chamber (3) by means of the holes (6). The electrode holder consists of a hollow cylinder (18) carrying a threaded sleeve into which the electrode screws. Since the sleeve is apt to be excessively heated by the electrode, the holder (18) is hollow and provided with a tube (30), electrically insulated, in which is another tube (31) connected to a supply of cooling water. The water enters by the tube (31), passes thus into the tube (30), through which it is discharged at its outer end. The electrodes (5) and the holders (18) pass through two hollow cylinders (8) and (12). Cylinder (8) is made of cast iron and carries the refractory head 7, and water channel 9, supplied by conduits 10, 11, and is mounted in the casing (1); attached to the cylinder 8 is cylinder (12) having in its upper part cooling ribs (14) and a circular chamber (15) for the circulation of water. Cylinder (12) is closed at the outer end by the washer (16) and head (17), the latter suitably insulated where the holder (18) passes through it. Two insulated rails (19) in lower part (13) of casing (12) are provided for the carriage (23), which is mounted on wheels (24) and attached to the sleeve (22). At the outer end of the holder (18) is an insulated arm (25) connected to another carriage (26), which slides on the rods (20), connected at their end by rod (21). The holder is moved by means of a hydraulic cylinder (29), the piston of which is connected to the carriage (26) by the piston rod (28) and arm (27).

Besides the holes for the passage of the electrodes, the melting chamber is provided with a tapping hole 32 on its front wall, with sight hole 33 shut by a plug 45 of refractory material and by a second metallic plug 46 with sand seal 47, and with a hole 34 for charging the material. A hopper is mounted above the latter hole, said hopper being constituted by a circular iron base 36, fixed on the wall 1 and having a hole corresponding to the opening 34, and a chamber 37 for the circulation of water. The plate 38 bearing the funnel 35 is pivoted on the upper surface of said base 36 and on its lower surface there is a circular cavity lined with refractory material in correspondence with the charging hole. A handle 39 permits turning the plate 38 on its base and a plug 40 shuts the funnel 35.

When it is required to charge the material into the furnace the hopper is left in the position shown in Fig. 1 and the funnel 35 and the chamber arranged under it are filled up, then the funnel is shut by means of the plug 40 and the plate 38 is caused to turn so as to bring said funnel in correspondence with the charging hole 34, in which position the material falls into the smelting chamber 3 without causing the inside of the latter to be into direct communication with the atmosphere.

The position of the electrodes may at any moment be adjusted by controlling the passage of the water into the cylinder 29, because the piston sliding in said cylinder is connected by the stem 28 to the carriage 26 to which the electrode carrying rod is connected, the latter being arranged so as to be able to be readily displaced, being connected by its lower end with the rollers 24 running on the rails 19. On the other hand the thermal efficiency of the furnace is considerably improved by the fact that the eccentrical position of the smelting chamber allows of reducing to the minimum the losses by radiation at the lower portion of the chamber which is less heated and to allow on the contrary an efficient cooling of the vault which is subjected to a more intense heating owing to the proximity of the arc.

What we claim as our invention and desire to secure by United States Letters Patent is:—

1. In an electric furnace comprising an outer envelop, electrodes and a closed substantially cylindrical melting chamber, said melting chamber arranged with its axis horizontal and eccentric with regard to the outer envelop, and a filling of refractory material encircling said chamber and having a greater thickness in its lower portion.

2. In an electric furnace comprising an outer envelop, electrodes and a closed melting chamber having a cross section constituted by two arcs connected by two right lines, said chamber having its axis horizontal and eccentric with regard to the outer envelop, and a filling of refractory material encircling said chamber and having a greater thickness in its lower portion.

3. In an electric furnace comprising an outer envelop, electrodes and a closed melting chamber eccentrically located with regard to the envelop, a charging hole, a plate on which a turning disk is pivoted, a funnel arranged on said disk, a plug of refractory material arranged above said charging hole, and means for causing said disk to turn and bring said funnel above the charging hole.

4. In an electric furnace comprising an outer envelop, electrodes and a closed melting chamber eccentrically located with regard to the outer envelop, electrodes entering in said chamber, each electrode being inclosed in an external cylinder, a hollow rod to which each electrode is connected, means for establishing a circulation of water in said rod, supports for each end of said rod, guides carried by said cylinders on which said supports may slide, and means for causing said rod to travel longitudinally to control the position of the electrode.

5. An electric furnace consisting of a casing, an inner furnace chamber having a substantially elliptical vertical cross-section eccentric thereto, a filling of refractory material between said casing and chamber, said filling being thicker below said chamber than above, and an air-lock charging means to said chamber.

6. An electric furnace comprising a casing, an inner furnace chamber having a substantially elliptical vertical cross-section eccentric thereto, and a filling of refractory material between said casing and chamber.

In testimony whereof we have signed our names to this specification in the presence of two subscribing witnesses.

ERNESTO STASSANO.
NAPOLEON PETINOT.

Witnesses as to signature of Ernesto Stassano:
CARLO TORBAY,
C. L. FEYLES.

Witnesses to signature of Napoleon Petinot:
R. H. WARREN,
WM. I. RUCKON.